United States Patent [19]
Harandi et al.

[11] Patent Number: 5,286,691
[45] Date of Patent: Feb. 15, 1994

[54] DEMETALLATION IN FCC REGENERATOR

[75] Inventors: Mohsen N. Harandi, Langhorne, Pa.; Joseph A. Herbst, Turnersville; Hartley Owen, Belle Mead, both of N.J.; Paul H. Schipper, Doylestown, Pa.; Robert T. Thomson, Lawrenceville, N.J.

[73] Assignee: Mobil Oil Coproration, Fairfax, Va.

[21] Appl. No.: 966,475

[22] Filed: Oct. 26, 1992

[51] Int. Cl.$^5$ .................. B01J 38/30; B01J 29/38; B01J 38/72; C10G 11/18
[52] U.S. Cl. .................. 502/41; 208/52 CT; 208/164; 208/113; 422/144; 502/21; 502/42; 502/516
[58] Field of Search .................. 502/41, 42, 516, 21; 208/52 CT, 164

[56] References Cited

U.S. PATENT DOCUMENTS

| | | | |
|---|---|---|---|
| 2,533,026 | 12/1950 | Matheson | 502/41 |
| 4,895,636 | 1/1990 | Chen et al. | 208/113 |
| 4,944,865 | 7/1990 | Occelli | 502/521 |
| 5,021,145 | 6/1991 | Chapple | 502/521 |
| 5,057,205 | 10/1991 | Chin et al. | 208/121 |
| 5,110,775 | 5/1992 | Owen | 502/42 |

Primary Examiner—Paul E. Konopka
Attorney, Agent, or Firm—Alexander J. McKillop; Malcolm D. Keen; Richard D. Stone

[57] ABSTRACT

A process for demetallizing metals contaminated FCC catalyst in an FCC regenerator. A metals getter additive, with higher settling velocity, is added to the regenerator, to remove metals from FCC catalyst by solid-solid interaction. The FCC catalyst forms a light, discrete, dense phase fluidized bed on top of a fluidized bed of additive. FCC catalyst is recycled to the cracking reactor from the top fluidized bed, while additive can be withdrawn from the lower fluidized bed for disposal or for metals recovery and recycle. Additive can be optimized for metals removal and will not dilute the cracking catalyst in the FCC reactor.

10 Claims, 2 Drawing Sheets

DEMETALLATION IN FCC REGENERATOR

BACKGROUND OF THE INVENTION

1. Field of the Invention

The invention relates to a process and apparatus for the regeneration of fluidized catalytic cracking catalyst.

2. Description of Related Art

In the catalytic cracking (FCC) process, catalyst, having a particle size and color resembling table salt and pepper, circulates between a cracking reactor and a catalyst regenerator. In the reactor, hydrocarbon feed contacts a source of hot, regenerated catalyst. The hot catalyst vaporizes and cracks the feed at 425C–600C, usually 460C–560C. The cracking reaction deposits carbonaceous hydrocarbons or coke on the catalyst, thereby deactivating the catalyst. The cracked products are separated from the coked catalyst. The coked catalyst is stripped of volatiles, usually with steam, in a catalyst stripper and the stripped catalyst is then regenerated. The catalyst regenerator burns coke from the catalyst with oxygen containing gas, usually air. Decoking restores catalyst activity and simultaneously heats the catalyst to, e.g., 500C–900C, usually 600C–750C. This heated catalyst is recycled to the cracking reactor to crack more fresh feed. Flue gas formed by burning coke in the regenerator may be treated for removal of particulates and for conversion of carbon monoxide, after which the flue gas is normally discharged into the atmosphere.

Catalytic cracking has undergone progressive development since the 40s. The trend of development of the fluid catalytic cracking (FCC) process has been to all riser cracking and use of zeolite catalysts. A good overview of the importance of the FCC process, and its continuous advancement, is reported in Fluid Catalytic Cracking Report, Amos A. Avidan, Michael Edwards and Hartley Owen, as reported in the Jan. 8, 1990 edition of the *Oil & Gas Journal*.

Modern catalytic cracking units use active zeolite catalyst to crack the heavy hydrocarbon feed to lighter, more valuable products. Instead of dense bed cracking, with a hydrocarbon residence time of 20–60 seconds, much less contact time is needed. The desired conversion of feed can now be achieved in much less time, and more selectively, in a dilute phase, riser reactor.

There has been considerable evolution in the design of FCC units, which evolution is reported to a limited extent in the Jan. 8, 1990 *Oil & Gas Journal* article. Many FCC designs have evolved and many modifications proposed to permit the units to process heavier feeds and especially with feeds containing more metals. Metals such as Ni and V are poisons in the FCC process, reducing gasoline yields and increasing production of dry gas such as hydrogen and methane.

Some workers have tried to cope with high metals feeds by removing the metals just upstream of the FCC process in a fluidized bed demetallation process. Such units remove metals, but are expensive with a cost and size similar to that of an FCC unit.

Allowing the metals to deposit on the FCC catalyst and then passivating with various additives is effective, but some of the additives, e.g., antimony, are toxic and can make the spent FCC catalyst toxic waste. Many of these additive are more effective for Ni than V.

Metals removal from contaminated FCC catalyst is an option, but it a somewhat difficult and expensive one because the metals levels which can be tolerated on FCC catalyst are relatively low, i.e., FCC catalyst becomes poor catalyst long before it becomes a rich source of metal ore. The DEMET process is designed to remove small concentrations of metal from FCC catalyst and permit reuse of the demetallized FCC catalyst in the FCC process. Such a process is also difficult because the FCC catalyst used is sensitive to many processing steps, i.e., it is easy to remove all the metal and destroy the catalytic activity of the FCC catalyst, while much more difficult to have efficient metals removal coupled with retention of satisfactory cracking activity.

We believed the demetallation approach could be made even more effective if it were possible to increase the concentration of the metal on the solids fed to a demetallation process and/or simplify the demetallation processing by using a more robust solid support for the metal(s) than FCC catalyst. It is interesting to review some work that has done on using something other than FCC catalyst to collect feed metals.

Some workers have added circulating metal getters, which react rapidly with Ni and V compounds in the feed. This approach is effective but dilutes the cracking catalyst.

More effective use of the additive is possible if added in a form where its effectiveness is increased sufficiently that its concentration may be reduced. U.S. Pat. No. 4,980,049, incorporated by reference, taught adding relatively small amounts, on the order of 1 to 5 wt %, of soft alumina having an average particle size of 10 to 40 microns. Such getter additives attrit and migrate out of the unit.

U.S. Pat. No. 4,980,050, incorporated by reference, taught use of large particles of friable alumina, e.g., 100–250 microns, as a getter. The process operated with reducing conditions in the regenerator to minimize migration of metal from the getter additive to the zeolite cracking catalyst.

U.S. Pat. No. 4,875,994, which is incorporated by reference, taught use an elutriable mixture of conventional FCC catalyst and large, coarse particles of demetallizing additive. The additive saw the feed first, in the base of a riser reactor and preferably was decoked in an additive regenerator, run under reducing conditions to minimize formation of highly oxidized and volatile metal species U.S. Pat. No. 4,895,636, incorporated by reference, taught use of large, coarse getter additives such as alumina or sponge coke, but kept the additive segregated from the conventional FCC catalyst. A separate additive regenerator was provided.

U.S. Pat. No. 5,057,205, incorporated by reference, taught use of an additive which removed SOx and captured metals. Use of small sized additive was preferred, but heavier additives were taught as suitable so long as they were not permitted to accumulate in the regenerator. An elutriating regenerator was shown in FIG. 2, which could be used to elutriate particles of low density from particles of high density. The additive could be either the low or the high density particle. A separate additive regenerator 11 is shown in FIG. 1.

We reviewed the work that others had done with a view to improving the ability of the FCC unit to crack heavy, metals laden feeds. We wanted to deal with the problem of too much Ni and V in the FCC feed but without diluting the catalyst. We wanted to avoid the cost of a separate additive regenerator. We wanted to be able to recover the metals in the FCC feed in a more concentrated form so that these metals could become a potentially valuable product rather than a disposal problem.

We discovered a way to crack high metals feeds, without unduly contaminating the FCC catalyst, by taking several steps backward in the art. We used a metals getting additive but kept it out of the riser where the high metals feed was added by forcing the additive to accumulate in the regenerator. We ran our regenerator under highly oxidizing conditions, which promote formation of highly oxidized vanadium species which could readily attack zeolite structure like a cancer. Finally, we forced our additive to stay in the regenerator a long time, rather than attrit or be swept out of the regenerator. This unlikely set of conditions led to a process permitting effective demetallation of the FCC catalyst and efficient recovery of much of the FCC feed metal, especially the V content of the fresh hydrocarbon feed, without diluting the FCC catalyst charged to the riser.

BRIEF SUMMARY OF THE INVENTION

Accordingly, the present invention provides a process for regenerating and demetallizing a metal contaminated fluidized catalytic cracking catalyst comprising: charging to a catalyst regeneration means a spent cracking catalyst having an average particle size within the range of 50 to 100 microns and having a settling velocity at FCC regeneration conditions and containing coke and at least one of Ni, V and Fe deposited thereon during catalytic cracking of a metals containing feed; regenerating said spent catalyst in said regeneration means by contact with oxygen or an oxygen containing gas at regeneration conditions including a superficial vapor velocity; maintaining a fluidized bed of regenerated catalyst within said regeneration means; demetallizing said regenerated catalyst in said regeneration means by solid-solid interaction with a metals getting additive having an affinity for metals at FCC regeneration conditions, and separable by elutriation or settling within said regeneration means from said regenerated FCC catalyst; withdrawing regenerated catalyst, essentially free of said metals getting additive, from said regenerator vessel for reuse in the cracking reaction via an FCC catalyst withdrawal means within regeneration means; and withdrawing, at least periodically, said metals getting additive from said regenerator vessel for disposal or metals removal via an additive withdrawal means located within said discrete phase of fluidized additive and below said fluidized bed of FCC catalyst.

In another embodiment, the present invention provides a process for the fluidized catalytic cracking of a vanadium containing hydrocarbon feed to catalytically cracked products comprising: catalytically cracking in a fluidized catalytic cracking (FCC) reactor means at catalytic cracking conditions including a cracking reactor temperature of 900 to 1200 F. a cat:oil weight ratio of 1:1 to 10:1, and pressure from 10 to 100 psia, a hydrocarbon feed comprising hydrocarbons boiling above 650 F and containing more than 0.1 wt ppm V by contact with a source of particulates consisting essentially of fluidizable particles having an average particle size within the range of 20 to 100 microns to produce catalytically cracked products and spent catalyst containing coke and vanadium or vanadium compounds; separating cracked products from spent catalyst; stripping spent catalyst in a catalyst stripping means with stripping gas to produce stripped catalyst; regenerating said stripped catalyst in a catalyst regeneration means at catalyst regeneration conditions including a temperature of 1000 to 1800 F and a pressure of 5 to 100 psia by contact with an oxygen containing gas to produce a fluidized bed of regenerated catalyst containing oxidized vanadium compounds; demetallizing said regenerated catalyst within said fluidized bed in said regeneration means by particle to particle contact with a demetallation additive having an affinity for oxidized vanadium compounds, said additive having an average particle size in excess of 100 microns and at least 50% greater than the particle size of said FCC catalyst, and wherein fluidization conditions within said bed of regenerated catalyst in said regenerator permit settling of said additive within said fluidized bed of regenerated catalyst to form a discrete, dense phase fluidized bed of additive under said fluidized bed of regenerated catalyst; and withdrawing regenerated catalyst from said fluidized bed of regenerated catalyst via a regenerated catalyst withdrawal means within said fluidized bed of regenerated catalyst and above said discrete, dense phase fluidized bed of additive.

In an apparatus embodiment, the present invention provides an apparatus for the fluidized catalytic cracking of a vanadium containing hydrocarbon feed comprising: a riser cracking catalytic cracking reactor means having a base portion and a top portion, said base portion receiving a supply of regenerated cracking catalyst and a supply of vanadium containing feed, and said top portion discharging catalytically cracked products and spent catalyst containing vanadium; a cracked product and spent catalyst separation means separating a cracked product vapor phase from said a spent catalyst stream; a spent catalyst stripping means receiving said catalyst stream from said separation means and producing stripped catalyst; a catalyst regeneration vessel comprising a base region, a mid region, and an upper region, said base portion comprising an inlet for stripped catalyst from said stripping mean,; an inlet for regeneration gas, and an outlet connective with a means for removing metal from a demetallizing additive having an average particle size of 200 to 7000 microns; said middle portion comprising an outlet for regenerated FCC catalyst connective with said riser reactor inlet; and said upper portion comprising an outlet for regenerator flue gas.

DESCRIPTION OF PREFERRED EMBODIMENTS

Figure 1:
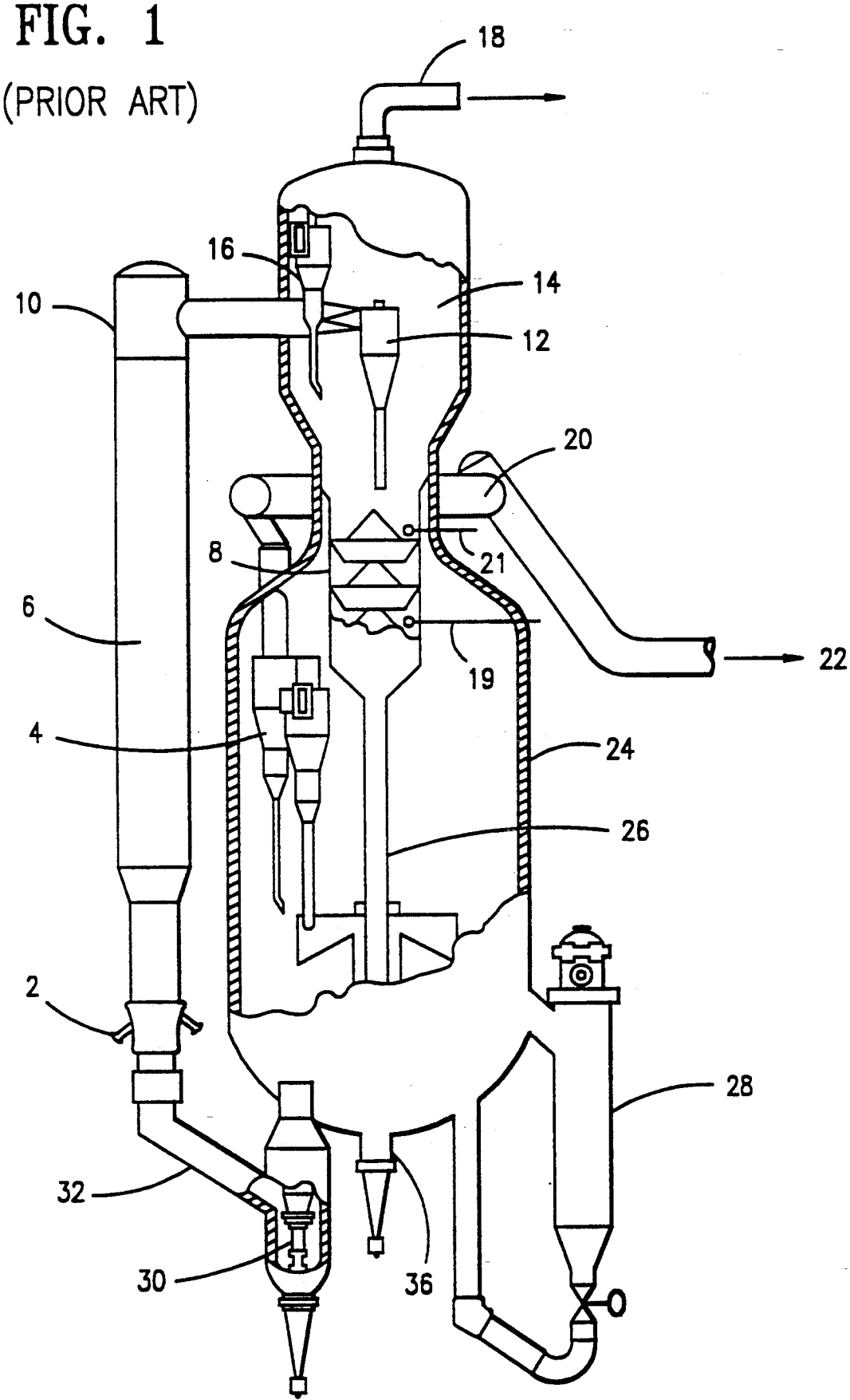
FIG. 1 (prior art) is a schematic view of a conventional "Orthoflow" fluidized catalytic cracking unit.

FIG. 1 is a simplified schematic view of an FCC unit of the prior art, similar to the Kellogg Ultra Orthoflow converter Model F shown as FIG. 17 of Fluid Catalytic Cracking Report, in the Jan. 8, 1990 edition of *Oil & Gas Journal*. There are myriad other FCC units which can benefit from the process of the present invention, but the process of the present invention works very well with this type of regenerator.

A heavy feed such as a gas oil, vacuum gas oil is added to riser reactor 6 via feed injection nozzles 2. The cracking reaction is almost completed in the riser reactor, which takes a 90° turn at the top of the reactor at elbow 10. Spent catalyst and cracked products discharged from the riser reactor pass through riser cyclones 12 which efficiently separate most of the spent catalyst from cracked product. Cracked product is discharged into disengager 14 and eventually is removed via upper cyclones 16 and conduit 18 to the fractionator.

Spent catalyst is discharged down from a dipleg of riser cyclones 12 into catalyst stripper 8 where one, or preferably 2 or more, stages of steam stripping occur, with stripping steam admitted by means not shown in the figure. The stripped hydrocarbons, and stripping steam, pass into disengager 14 and are removed with cracked products after passage through upper cyclones 16.

Stripped catalyst is discharged down via spent catalyst standpipe 26 into catalyst regenerator 24. The flow of catalyst is controlled with spent catalyst plug valve 36.

Catalyst is regenerated in regenerator 24 by contact with air, added via air lines and an air grid distributor not shown. A catalyst cooler 28 is provided so heat may be removed from the regenerator if desired. Regenerated catalyst is withdrawn from the regenerator via regenerated catalyst plug valve assembly 30 and discharged via lateral 32 into the base of the riser reactor 6 to contact and crack fresh feed injected via injectors 2 as previously discussed. Flue gas, and some entrained catalyst, is discharged into a dilute phase region in the upper portion of regenerator 24. Entrained catalyst is separated from flue gas in multiple stages of cyclones 4 and discharged via outlets 38 into plenum 20 for discharge to the flue gas line via line 22.

This regenerator provides an ideal base for the practice of the present invention. The bubbling dense bed in such a regenerator exhibits excellent horizontal mixing, and the heat exchanger 28 allows full CO burn operation even with heavy feeds. The relatively large cross sectional area of the regenerator, and the uniform distribution of spent catalyst, prevents localized regions of either stagnant or highly agitated operation, permitting effective contacting of large coarse solids with the conventional cracking catalyst with only minor modifications, discussed at length with the review of FIG. 2.

Figure 2:
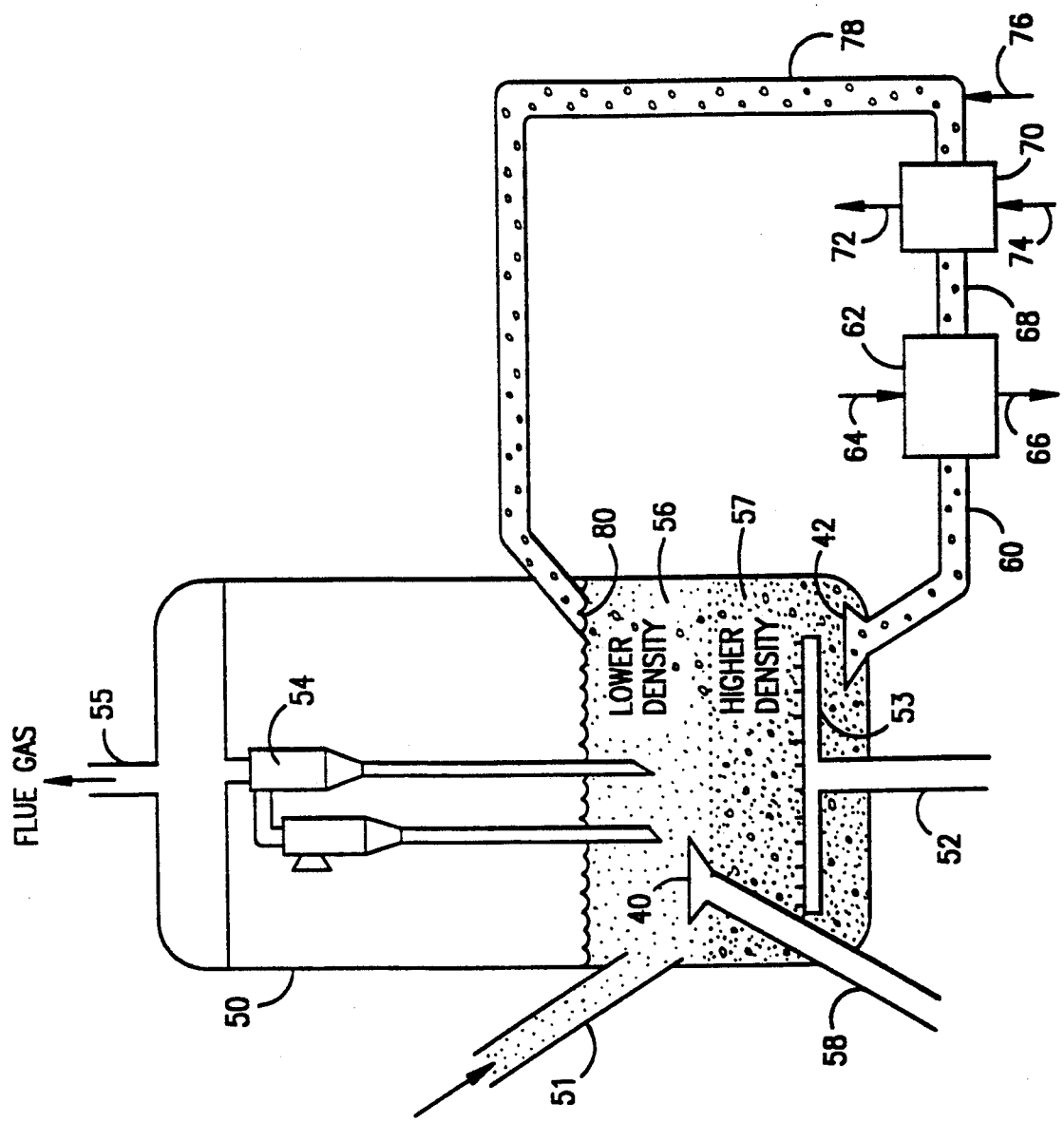
FIG. 2 (invention) is a schematic view of a regenerator and metals recovery unit of the invention.

In FIG. 2 (invention) the basic process is the same as in FIG. 1 (i.e., the reactor, etc. can be identical). A different regenerator is shown, which does not have the favorable flow characteristics of the Orthoflow regenerator but has more favorable display characteristics to show how a bubbling dense bed regenerator would be used to practice the present invention.

The FIG. 2 regenerator apparatus 50 is conventional, and is taken from FIG. 2 of U.S. Pat. No. 5,057,205, which was incorporated by reference.

Spent catalyst from a cracking reactor is discharged via line 51 into catalyst regenerator 50. The cracking catalyst will be conventional equilibrium catalyst. The catalyst meets particles of higher density, and/or larger size, or preferably both, which accumulate as a dense phase fluidized layer 57. There can be considerable traffic between high density layer 57 and lower density layer 56 both ways. Incoming spent catalyst flows down into high density region 57, mixing to some extent with higher density particles there, and then swept or eluted into region 56 by regeneration air added via line 52 and air distributor 53. Preferably the design and operating parameters are set so that essentially no particles of higher density are constantly swept or entrained into the region of lower density, while lighter particles from region 56 mostly stay in that region, flow upward or are sent to the reactor. Much FCC catalyst is entrained into cyclones 54, which recover entrained catalyst and return it to the dense bed. Flue gas is withdrawn via line 55.

Regenerated catalyst is withdrawn via bathtub 40 in low density region 56 and recycled via line 58 to the cracking reactor, not shown. Optional screens, not shown, may be placed on bathtub 40 to prevent flow of any large particles into line 58. Additive can be allowed to remain in the unit for months or years until the next plant turnaround, continuously or intermittently replaced with fresh additive, or continuously or intermittently "regenerated" in a contiguous or remote demetallation facility. Additive is preferably withdrawn at least intermittently via lower bathtub 42 and line 60 and sent to demetallation zone 62. One or more demetallizing solutions are added via line 64 to produce a metal rich liquor withdrawn via line 66. Treated additive is charged via line 68 from demetallizing zone 62 to optional zone 70 for drying or other processing steps. Alternatively, in some units zone 62 may serve to get the metals in a more highly oxidized, or at least decarbonized form, or contact the additive with acids or bases to enhance downstream metals removal which could then occur in zone 70.

Additive may be continuously or intermittently recycled via line 78 to an additive regenerator, where it is discharged via outlet 80, preferably in a lower portion of the regenerator. A lift gas, preferably a portion of the combustion air, may be added via line 76 to help move additive through the transfer line 78. The zones 62 and/or 70 can operate batch wise if desired. Optionally but preferably small particles entrained in line 60 are removed upstream of zone 62 using a fraction of regeneration air to carry the small particles to the regenerator 50 while leaving the large particles for further processing.

Although I prefer to recycle additive from the base of the additive bed to an upper portion of the same additive bed, it is possible and may be beneficial to recycle the additive to the high density region via the low density region. I prefer to promote extensive contact of the lower density material, usually it will be the FCC catalyst, with the additive or high density material by adding the low density material to a location(s) immersed within the higher density bed. By adding low low density material at or near the base of the high density bed region, I force all of the FCC catalyst to pass through the additive bed. The FCC catalyst circulation is very large in FCC units, with the entire catalyst inventory passing through the regenerator every 5 to 30 minutes, so operating in this way promotes extensive contact of FCC catalyst with additive.

Additive recycle, from within the high density region to the dilute phase region of the regenerator, may be used to remove heat from the dilute phase region. The additive particles can be heated in the dilute phase region, cooling the dilute phase, and the heated additive can then return to the dense bed region to heat the FCC catalyst. This can promote a more uniform temperature in the regenerator, which is highly beneficial even when demetallation is not needed, i.e., temperature swings can be damped even using an inert dense additive.

Preferably the FCC catalyst is added below the air grid or other air distribution means used to add and distribute regeneration air within the high density region. The relatively low superficial vapor velocities below the air grid, and the momentum of the incoming stream of spent catalyst, will promote dispersion of spent catalyst more uniformly across the base of the regenerator.

Preferably the base region of the regenerator, i.e., the region of higher density where an additive rich phase forms, is of reduced diameter relative to the bubbling dense bed rich in FCC catalyst. This allows higher velocities in the lower bed. Such a reduced diameter lower region is disclosed in allowed application U.S. Ser. No. 07/651,173, now U.S. Pat. No. 5,143,875, relating to a bubbling dense bed catalyst regenerator with higher efficiency base region which is incorporated by reference. The use of such a regenerator with a V getting additive, forming a separate, additive rich bubbling fluidized bed beneath a bubbling fluidized bed of FCC catalyst is believed to be new.

The bottom portion of the existing FCC regenerator may be modified, with concrete, fire brick, etc., on the sides, to provide a reduced diameter, higher velocity region to contain the large particle fluid bed.

Countercurrent additive circulation, from the base of the regenerator to upper regions of the regenerator, may be helpful but is not essential. The additive traffic will usually be one or more orders of magnitude smaller than the spent catalyst traffic, so most of the contacting of additive with FCC catalyst will occur from localized mixing, or by forcing the spent catalyst to flow up through the dense phase, additive rich, lower bed. Fortunately, bubbling fluidized beds are efficient mixers. The bubbling bed fluid dynamics alone will provide enough contact of low density FCC catalyst with high density metal trap material. In a conventional FCC regenerator bubbling dense bed, the catalyst residence time will be on the order of 5 minutes, but the turnover from the bottom of the bed to the top of the bed can be on the order of 5 to 15 seconds. In our process, the catalyst residence time can be conventional, or somewhat less, due to improved air and catalyst distribution through the high density region (the coarse particles will improve air and catalyst distribution to the lower density region 56) and to more oxidizing conditions in the bed, which increase coke burning rates. The coarse particles will not be segregated (depending on how large and how dense they are), since the fine FCC catalyst will act as an efficient fluidization aid for the dense bed and provide ample particle:particle contact to allow the additive to work.

DESCRIPTION OF PREFERRED EMBODIMENTS

FCC Feed

Any conventional FCC feed can be used. The process of the present invention is especially useful for difficult charge stocks, those with high levels of metals (particularly V) and CCR material, exceeding 2, 3, 5 and even 10 wt % CCR. The feed will frequently contain more than 0.1 ppm V, calculated on an elemental metal basis, and may contain more than 1 ppm V.

The feeds may range from the typical, such as petroleum distillates or residual stocks, either virgin or partially refined, to the atypical, e.g., coal oil or shale oil. The feed frequently will contain recycled hydrocarbons, such as heavy cycle oils which have already been subjected to cracking.

Preferred feeds are gas oils, vacuum gas oils, atmospheric resids, and vacuum resids, and mixtures thereof.

The present invention is most useful with feeds having an initial boiling point above about 650 F.

The most uplift in value will occur when a significant portion of the feed boils above about 1000 F or is considered non-distillable.

FCC Catalyst

Any commercially available FCC catalyst may be used. The catalyst can be 100% amorphous, but preferably includes some zeolite in a porous refractory matrix such as silica-alumina, clay, or the like. The zeolite is preferably 25-80 wt.% of the catalyst, with the rest being matrix. Conventional zeolites include X and Y zeolites, with ultra stable, or relatively high silica Y zeolites being preferred. Dealuminized Y (DEAL Y) and ultrahydrophobic Y (UHP Y) zeolites may be used. The zeolites may be stabilized with Rare Earths, e.g., 0.1 to 10 Wt % RE.

Relatively high zeolite contents, and use of high silica zeolite containing catalysts, are preferred for use in the present invention. They efficiently crack feed in less than a second and withstand the high temperatures preferred for short contact time cracking, especially when cracking resid feeds. The catalyst inventory may also contain one or more additives, either present as separate additive particles or mixed in with each particle of the cracking catalyst. Additives can be added to enhance octane (shape selective zeolites, i.e., those having a Constraint Index of 1-12, and typified by ZSM-5, and other materials having a similar crystal structure), adsorb SOX (alumina), remove Ni and V (Mg and Ca oxides). In our process, metals removal from FCC catalyst is so efficient that the need for circulating metal getters, or metals tolerant catalyst, is reduced or eliminated. Such materials will probably be present, and should provide some measure of additional protection for the FCC catalyst.

Additives for removal of SOx are available from several catalyst suppliers, such as Davison's "R" or Katalistiks International, Inc.'s "DeSOx." CO combustion additives are available from most FCC catalyst vendors.

The FCC catalyst composition, per se, forms no part of the present invention.

Getter Additive

The getter additive may be any material known in the art to have an affinity at FCC regeneration conditions for metals commonly deposited on FCC catalyst, especially for oxidized vanadia species. Such materials may be inert or reactive. Reactive materials have a higher affinity for, e.g., V2O5, but complicate recover of the vanadium compounds. Most of the commercially available metal getters contain alkaline oxides or rare earth metal oxides, which form immobile vanadate compounds upon interaction with vanadium oxides. Thus reactive getter additives include alkaline or alkaline earth metal oxides, and especially Na, Ba, Mg and Ca. We have tested BaTiO$_3$/Alumina, RE2O3/Alumina, and MgO/Alumina. Other materials which are believed suitable include RE2O3, MgO,BaTiO3, MAAPS, LAAPS, and similar materials.

U.S. Pat. No. 4,895,636 and 5,057,205, which have been incorporated by reference, disclose several coarse additives which can be used herein, although the use of the additives is considerably different in the process of the present invention. The prior art patents sought to use relatively large additives in a unit designed to allow the additve to see the fresh feed for extended times, and pass through the catalyst regenerator quickly. In contrast, the process and apparatus of the invention forces the additive to remain in the regenerator, and prevents contact of the additive with the fresh feed.

Many materials which the art taught as suitable for demetallizing FCC feed, such as magnesium aluminate spinel, can be used in the process of the present invention. Some materials used in the prior art, such as sponge coke or shot coke (see TABLE 1 of U.S. Pat. No. 4,895,636) may cause problems in the present invention, as the combustibles would increase the load on the regenerator. Thus it is preferred to use as a getter additive something which is not readily burned in the FCC regenerator.

The getter material should be stable in the FCC regenerator, and may be fairly reactive with oxidized V species, or inert. There are significant advantages to using a relatively pure and inert or refractory materials such as alumina. Such materials are readily available, can easily withstand FCC regenerator conditions, and can be repeatedly subjected to harsh chemical treatments for removal of metals such as V, and returned to the FCC regenerator. Thus pure alumina, or pure silica alumina, can also be used, so long as the type of porosity of the material are such as to permit efficient particle to particle metal transfer and accumulation.

We prefer to operate with 700 to 2000 micron materials, but considerable variation in size and density is possible. It is important that the fluidization characteristics of the additive, and the regeneration conditions, primarily superficial vapor velocity, be such as to permit the getter additive to accumulate in the base of the regenerator. Preferably two distinct fluidized bed phases will form, a lower phase comprising a majority by weight of getter additive, and an upper phase comprising a majority by weight of conventional FCC catalyst. Preferably the conditions are set so that at least 70% by weight of the additive phase is additive (with the remainder being conventional FCC catalyst which may act as a fluidization additive) and at least 90% of the FCC dense bed is FCC catalyst (with less than 10% additive present).

Cracking Reactor/Stripper

The FCC reactor and stripper work together to contact efficiently catalyst and feed. Conventional cracking and stripping conditions may be used, and further details on these processes may be taken from the patents incorporated by reference.

Cracking conditions will usually include temperatures of 900 to 1100 F, cat:oil ratios of 0.1:1 to 10:1, and pressures of atmospheric to 50 psig.

Stripping conditions include temperatures used in cracking; usually temperatures are a little lower due to use of relatively cool stripping steam, but a hot stripper may be used, if desired.

Preferably the reactor and stripper are designed so that any large particles of getter additive which happen to be present can be removed. Usually this will not be a problem with conventional riser reactor designs, which are open, and operate with high superficial vapor velocities. Some changes to the stripper design may be needed so that dead spaces are avoided which might entrap large particles of getter.

Regenerator Conditions

Conditions in the regenerator can be conventional but usually will be somewhat more severe than most FCC regenerators in terms of temperature, vapor velocity, and oxygen partial pressure.

Temperatures will usually be somewhat higher than normal because of the heavy feeds contemplated for use herein and because high temperatures promote metal migration to the additive. Excessive temperature in the regenerator can be controlled by use of a heat exchanger, such as that shown in FIG. 1, or other heat removal means. Regenerator temperature will usually range from 1000 to 1800 F, preferably from 1200–1600 F, with most units operating at about 1250 to 1500 F.

Vapor velocity will preferably be higher than normal to promote more vigorous fluidization. Vapor velocities will usually increase some merely to provide the increased amount of regeneration air preferred for more oxidizing conditions. Superficial vapor velocities may range from 0.1 to 15 fps, preferably from 0.25 to 7.5 fps, and most preferably from 0.5 to 5 fps. Very high vapor velocities are difficult to achieve in existing regenerators, and may overload the cyclones. These practical limits will limit most refiners to a maximum vapor velocity of around 5 fps in existing bubbling dense bed regenerators. The lower limit on superficial vapor velocity is set by that velocity needed for efficient fluidization of both regions of the dense bed, and will depend on the physical properties of the additive. Usually somewhat higher velocities will be needed to maintain good fluidization of large, dense particles than of FCC catalyst, which can conveniently be provided by reducing the diameter of this portion of the regenerator as previously discussed.

In our experiments, we learned that the superficial vapor velocity required for smooth fluidization of large particles (3.75 to 5.5 mm) decreases with the addition of small particles (0.056 mm) to the bed. We developed conditions in which large particles remained in the fluid bed while the small particles became entrained in the gas. This formed a fluidized bed of large particles through which small particles could circulate continuously. To promote this type of fluidization regime, we usually will prefer to add some or all of the spent FCC catalyst to the regenerator under or within the region of higher density formed by the getter additive in the lower portion of the regenerator. This forces the catalyst to pass up through the bed of getter additive, promoting good contact of catalyst and getter, and forces the FCC catalyst to act as a fluidization aid for the larger, and more difficult to fluidize, particles of getter additive.

The regenerator is preferably somewhat more oxidizing than conventional FCC regenerators to promote formation of highly oxidized metal species which are mobile at the conditions found in an FCC regenerator.

Oxidizing conditions are preferred to get the metals, particularly V, in a form where they may be readily removed in an external metals removal means. Preferably the flue gas from the FCC regenerator contains at least 0.5 mole % oxygen.

Pressures in the regenerator can be conventional, typically atmospheric pressure to perhaps 100 psig, preferably 10 to 100 psia. Most will run at 10 to 30 psig, somewhat higher than this if a power recovery system is installed.

Demetallation Zone 62

At its simplest, this can be a solids liquid contacting means such as a continuous web of porous material or screen, with additive dumped on it, passing under one or more water sprays. Other embodiments include simple washing with water, or more elaborate chemical treatments, such as those used in the commercially available DEMET process. Alternatively, the demetallation can be done at a remote site.

Drying Zone 70

Drying may occur in the transfer line itself.

Relative Circulation Rates

The optimum amount and circulation of additive is dependent on the amount of vanadium present on the spent FCC catalyst, the amount of additive present, the efficiency of getter additive, and the tolerance of the FCC catalyst for vanadium. Keeping large amounts of additive in higher density region 57, or use of a reactive additive, will generally permit an increase in vanadium concentration on additive, which will permit a reduction in additive circulation through the external demetallation zone.

For a typical FCC unit, with 200 tons of FCC catalyst in inventory, and circulating 25 tons/minute of catalyst to the reactor, the following guidelines can be given. The regenerator catalyst inventory in such a unit will be about 150 tons. The additive inventory should be about 50 tons in the regenerator so large amounts of additive are available to contact the FCC catalyst. Because of its greater density, the additive will usually be less of the bed than its weight in the unit, offset to some extent by the presence of large amounts, typically 5 to 30% of FCC catalyst, present as fines or as a fluidization aid in the region of higher density 57.

CO Combustion Promoter

Use of a CO combustion promoter in the regenerator or combustion zone is not essential for the practice of the present invention but is preferred. These materials are well known, and may be on the FCC catalyst, the large particle additive, or both.

U.S. Pat. No. 4,072,600 and U.S. Pat. No. 4,235,754, incorporated by reference, disclose operation of an FCC regenerator with minute quantities of a CO combustion promoter. From 0.01 to 100 ppm Pt metal or enough other metal to give the same CO oxidation may be used with good results. Very good results are obtained with as little as 0.1 to 10 wt. ppm platinum present on the catalyst in the unit.

Experiments

Several experiments were conducted to test vanadium transfer between alumina and a sample of commercial RE-USY catalyst. Various blends of alumina, the commercial FCC for 10 hours in an atmosphere of 45% steam and 55% air.

A partition coefficient (PC) was calculated for each experiment using the following relationship:

PC=(% V FCC Cat/FCC cat wt)/(% V on alumina/alumina wt)

A blend of pure alumina, with 3000 ppm V as $V_2O_5$ produced an alumina with 2600 ppm V, for a vanadium closure of 87%. This did not test any partitioning, as there was no FCC catalyst present.

A blend of 80% FCC catalyst and 20% alumina, with 3000 ppm V as $V_2O_5$ produced an alumina with 1910 ppm V, and an FCC catalyst with 4100 ppm V (measured) or 3273 ppm V (calculated), to produce partition coefficients of 0.4 and 0.5 respectively, with a V closure of 122%

A blend of 80% FCC catalyst contaminated with 4100 ppm V (measured) and 20% alumina, containing 0 ppm V produced after steaming alumina containing 805 ppm V and FCC catalyst with 3100 ppm V. The Partition Coefficient was 0.96, and the V closure was 81%.

These experiments show that particle to particle demetallation of FCC catalyst is possible at conditions found in FCC regenerators. Use of this mechanism to remove V, and perhaps other metals, allows demetallation additives to be used without concern about their effect on the FCC process, e.g., additives containing sodium or calcium, or additives consisting of spent hydrotreating catalyst, can be used without damaging the FCC catalyst or disrupting the FCC cracking reaction. Handline, and demetallation, of large size additive is much simpler than processing FCC catalyst.

We claim:

1. A process for regenerating and demetallizing a metal contaminated fluidized catalystic cracking catalyst comprising:
   a. charging to a catalyst regeneration means a spent cracking catalyst having an average particle size within the range of 50 to 100 microns and having a settling velocity at FCC regeneration conditions and containing coke and at least one of Ni, V and Fe deposited thereon during catalytic cracking of a metals containing feed;
   b. regenerating said spent catalyst in said regeneration means by contact with oxygen or an oxygen containing gas at regeneration conditions including a superficial vapor velocity;
   c. maintaining a fluidized bed of regenerated catalyst within said regeneration means;
   d. demetallizing said regenerated catalyst in said regeneration means by solid-solid interaction with a metals getter additive having an affinity for metals at FCC regeneration conditions, and separable by elutriation or settling within said regeneration means from said regenerated FCC catalyst
   e. withdrawing regenerated catalyst, essentially free of said metals getter, from said regenerator vessel for reuse in the cracking reaction via an FCC catalyst withdrawal means within said regeneration means; and
   f. withdrawing, at least periodically, said metals getter from said regenerator vessel for disposal or metal removal via an additive withdrawal means located within said discrete phase of fluidized additive and below said fluidized bed of FCC catalyst and wherein
   g. said regeneration means comprises a single vessel containing a bubbling, dense phase fluidized bed of FCC catalyst above a discrete phase of metals getter and spent catalyst is added via an inlet within or beneath said discrete phase of metals getter.

2. The process of claim 1 wherein said additive has a particle size at least 20% greater than said FCC catalyst.

3. The process of claim 1 wherein the additive has an average particle size of 500 to 5000 microns.

4. The process of claim 1 wherein the additive has an average particle size of 700 to 2000 microns.

5. The process of claim 1 wherein said additive phase is withdrawn and charged to an additive demetallation means producing a demetallized additive with a reduced metals content, and said demetallized additive is recycled to said regeneration means.

6. The process of claim 1 wherein said additive absorbs but does not chemically react with oxidized vanadium species.

7. The process of claim 7 wherein said additive is alumina.

8. The process of claim 1 wherein said additive chemically reacts with oxidized vanadium species.

9. The process of claim 1 wherein said additive comprises an alkaline earth metal or rare earth metal oxide.

10. The process of claim 1 wherein said additive comprises at least one of $BaTiO_3$, $Re_2O_3$ and $MgO$.

* * * * *